United States Patent [19]
Katagiri

[11] Patent Number: 6,002,139
[45] Date of Patent: Dec. 14, 1999

[54] IMAGE INPUT DEVICE HAVING A REFRACTIVE INDEX LIGHT GUIDE AND LENSES

[75] Inventor: Masayuki Katagiri, Ikoma, Japan

[73] Assignee: Sharp Kabushiki Kaisha, Osaka, Japan

[21] Appl. No.: 08/977,833

[22] Filed: Nov. 26, 1997

[30] Foreign Application Priority Data

Dec. 26, 1996 [JP] Japan .................................. 8-347042

[51] Int. Cl.[6] .................................................... G06K 5/00
[52] U.S. Cl. ...................................... 250/556; 250/227.24
[58] Field of Search ............................... 250/556, 227.24, 250/227.2, 227.11; 358/401, 400

[56] References Cited

U.S. PATENT DOCUMENTS 5,416,608  5/1995  Ueda et al. ........................ 250/227.11
5,430,462  7/1995  Katagiri et al. ......................... 345/104

FOREIGN PATENT DOCUMENTS 63-214058  9/1988  Japan .
5-347396  12/1993  Japan .
8-191371  7/1996  Japan .

*Primary Examiner*—Que T. Le
*Attorney, Agent, or Firm*—Morrison & Foerster, LLP

[57] ABSTRACT

An image input device includes a light source, a light guide for guiding the light, a first and a second low refractive index layer formed on surfaces of the light guide, the first and second low refractive index layers having a lower refractive index than that of the light guide, a light input device to make the light from the light source incident onto the light guide so that the incident light is totally reflected at the boundary of the light guide with the first or second low refractive index layer, a photoelectric converter, the photoelectric converter being disposed on the second low refractive index layer and an optical element having a plurality of lenses optically contacted with the surface of the light guide via the first low refractive index layer, the optical element taking out part of the light traveling in the light guide to illuminate a document and collecting reflected light from the document onto the photoelectric converter by means of the lenses.

15 Claims, 3 Drawing Sheets

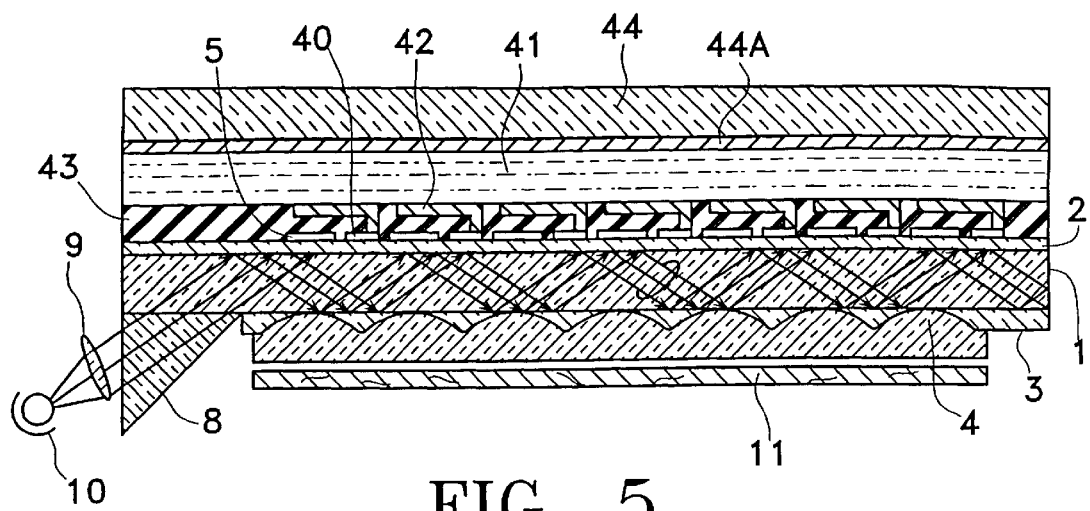
FIG. 5
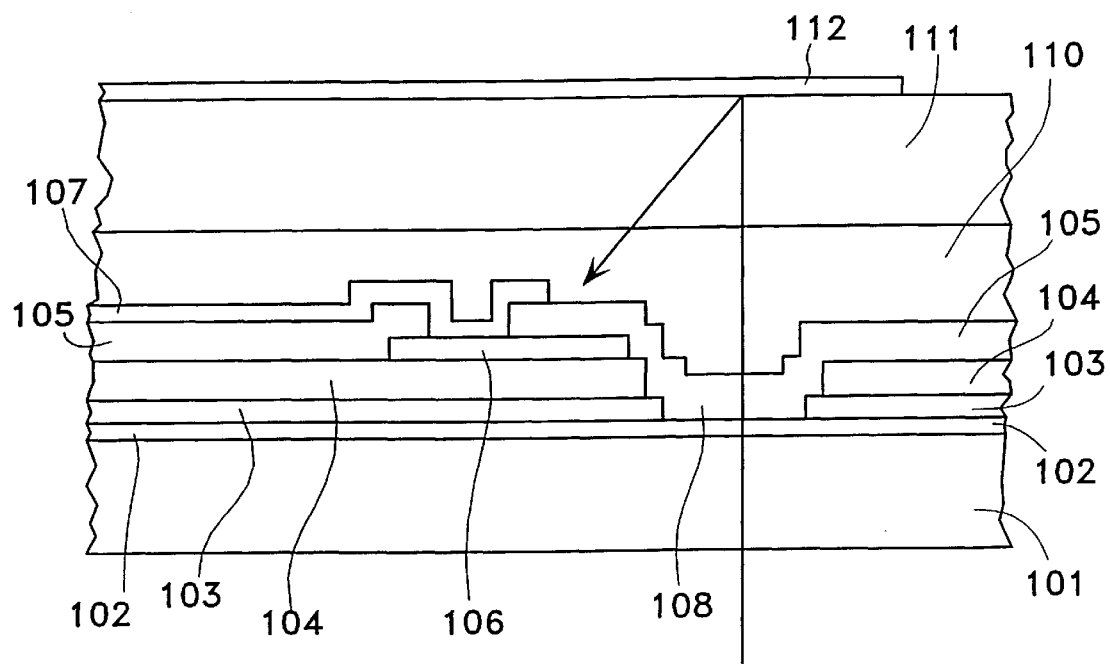
FIG. 6
(PRIOR ART)
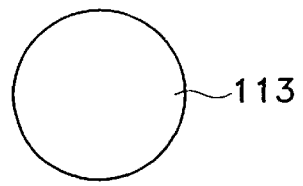

IMAGE INPUT DEVICE HAVING A REFRACTIVE INDEX LIGHT GUIDE AND LENSES

CROSS-REFERENCE TO RELATED APPLICATION

This application is related to Japanese application No. HEI 8(1996)-347042, filed on Dec. 26, 1996 whose priority is claimed under 35 USC §119, the disclosure of which is incorporated by reference in its entirety.

BACKGROUND OF THE INVENTION

1. Field of the Invention

The present invention relates to an image input device connected to a personal computer or a portable terminal, or an image input device used with a facsimile machine or digital copier.

2. Description of Related Art

Image sensors used for image input devices to read images of source documents are generally classified into a reduction projection type, a contact type and an absolute contact type. Since a device of the reduction projection type projects an image of a source document onto a CCD through a lens, the device tends to be large and therefore is not suitable for portable use. On the other hand, devices of the contact type and of the absolute contact type are thinner than that of the reduction projection type and also superior in operability.

In recent years, a slimmer, weight-reduced image input device for portable use which has higher resolution and is capable of reading images at higher speed has been sought after. In view of thickness and weight reduction and of high-speed reading, also used is a two-dimensional image sensor which does not need a mechanical part.

FIG. 6 is a sectional view illustrating the structure of a conventional image sensor of the absolute contact type. A glass substrate 101 is coated with a silicon oxide film 102 and a metal electrode 103 is formed thereon. Then a semiconductor film 104 having photoelectric effect is formed, an electrically conductive transparent film 106 is formed on a portion which serves as a photoelectric converter. An insulation transparent film 105 and a metal electrode 107 are deposited thereon in this order. Further a transparent layer 110 which also serves as an adhesion layer is applied thereon, and a thin glass plate 111 is adhered thereto. The metal electrode 103 is provided with a light let-in window 108 for letting light through in correspondence to the photoelectric converter. In this image sensor, light emitted by a light source 113 passes through the light let-in window 108 and illuminates a document 112. Light reflected according to contrast on the document is incident on the semiconductor layer 104 that serves as the photoelectric converter, and thus the image of the document 112 is read.

However, with the conventional image input device by use of an image sensor as described above, a first problem is that a sufficient S/N ratio cannot be obtained. In other words, if the area of the light let-in window 108 is increased with the view of increasing the amount of light illuminating the document 112 with retaining the resolution, the area of the photoelectric conversion means decreases. On the other hand, if the area of the photoelectric conversion means is increased, the amount of illuminating light decreases. Therefore, it is impossible to raise the resolution.

Further, since a boundary is formed between the transparent layer 110 and the thin glass plate 111 which have different refractive indexes, the illumination light is partly reflected at this boundary and becomes stray light. As a result, contrast declines. This is a second problem.

Furthermore, since the above-described image sensor does not have a lens, the photoelectric converter also receives reflected light from an adjacent pixel. As a result, the resolution declines. The larger the resolution is intended to be, the more remarkable the adverse effect thereof becomes. This is a third problem.

The first and third problems especially turn out to be more serious in the case of the two-dimensional image sensor. The reason is that, in the case of a one-dimensional image sensor, there is room in the direction perpendicular to a sensor array, i.e., in the direction perpendicular to a paper face in FIG. 6. Therefore, even if the width of the light let-in window 108 is reduced, the depth dimension can be enlarged. On the other hand, in the case of the two-dimensional image sensor, it is impossible to enlarge the depth dimension and it is extremely difficult to keep a passageway for the illumination light. As for the influence of light from adjacent pixels, in the case of the one-dimensional image sensor, light from adjacent pixels on both sides, at most, has influence. In the case of the two-dimensional image sensor, however, light from all surrounding pixels has influence.

With such a structure that, with respect to the surface on which the photoelectric conversion means is disposed, the source document is placed thereabove and reflects illumination light incident from below the surface to make the reflected light incident onto the photoelectric converter, it is difficult to integrate the image sensor with a display device. This is another problem.

As other related art to the present invention, Japanese Unexamined Patent Publication (Kokai) No. Sho 63(1988)-214058 discloses an image sensor of the contact type wherein light from a light source is introduced by a transparent substrate, the optical path of the light is bent by a reflection plan to illuminate a document surface, light reflected on the document surface is collected by microlenses and an image of the document is formed on photoreceiver elements.

Japanese Unexamined Patent Publication (Kokai) No. Hei 5(1993)-347396 discloses an image reading device wherein a photoelectric converting layer is provided with a light let-in window to pass illumination light through.

Japanese Unexamined Patent Publication (Kokai) No. Hei 8(1996)-191371 discloses an image sensor wherein light from a light source is introduced by a light guiding layer, the light is transmitted by repeating the scattering and reflection by a light scattering layer and a light reflecting layer to illuminate a document surface, and light reflected from the document surface is directed to a photoreceiver element by a light passing section.

U.S. Pat. No. 5,430,462 discloses a technique of passing light through a device composed of a liquid crystal layer and a photo-conductive layer which are laminated, from the photo-conductive layer side to illuminate a document surface.

SUMMARY OF THE INVENTION

An object of the present invention is to provide an image input device suitable for the two-dimensional image sensor, which has an improved S/N and contrast ratio, is free of generation of stray light from illumination light and has an improved resolution, and further to provide an image input device which can be integrated into a display device.

The present invention provides an image input device comprising a light source to emit light, light guide means for guiding the light having opposed surfaces, a first low refractive index layer formed on one of the opposed surfaces of the light guide means, the first low refractive index layer having a lower refractive index than the refractive index of the light guide means, a second low refractive index layer formed on the other of the opposed surfaces of the light guide means, the second low refractive index layer having a lower refractive index than the refractive index of the light guide means, light input means to make the light emitted by the light source incident onto the light guide means so that the incident light is totally reflected at a boundary between the light guide means and the first low refractive index layer and at a boundary between the light guide means and the second low refractive index layer, photoelectric conversion means for photoelectric conversion, the photoelectric conversion means being disposed on the second low refractive index layer, and optical means having a plurality of lenses optically contacted with the surface of the light guide means via the first low refractive index layer, the optical means taking out part of the light traveling within the light guide means to illuminate a document and collecting light reflected from the document onto the photoelectric conversion means by means of the lenses.

Other objects and aspects of the invention will become apparent from the following description of embodiments with reference to the accompanying drawings in which:

BRIEF DESCRIPTION OF THE DRAWINGS

FIG. 5 is a sectional view of the structure of an image input device in accordance with Embodiment 4 of the present invention;

FIG. 6 is a sectional view of the structure of a conventional image input device.

DESCRIPTION OF THE PREFERRED EMBODIMENTS

Figure 1:
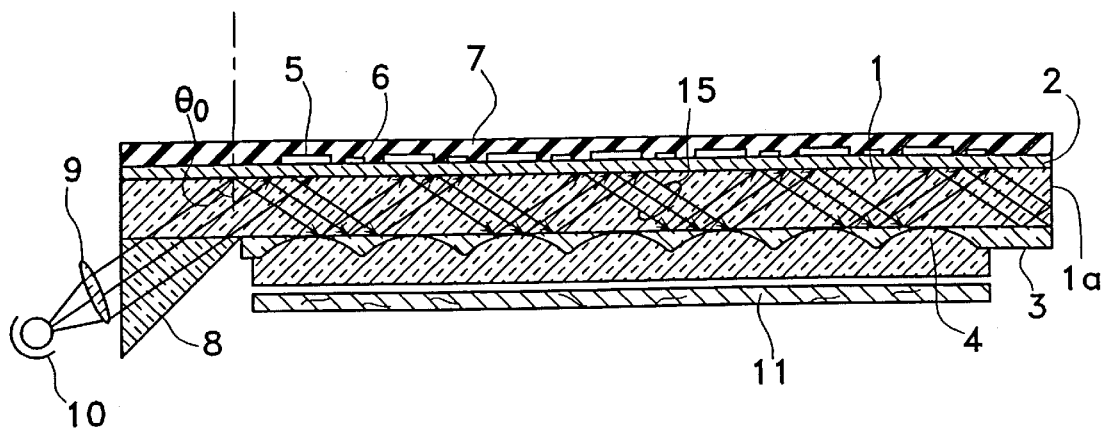
FIG. 1 is a sectional view of the structure of an image input device in accordance with Embodiment 1 of the present invention.

In the present invention, the photoelectric conversion means may be two-dimensionally arranged.

A reflection film may be disposed at an end of the light guide means.

Both the light source and the light input means may be mounted to each end of the light guide means.

A display means may be mounted on the photoelectric conversion means and the image input device may be integrated with the display means.

According to the present invention, the light emitted by the light source is made incident onto the light guide means at a predetermined angle by the light input means. The first and the second low refractive index layers are formed on vertically opposed surfaces of the light guide means. The light incident on the light guide means travels within the light guide means with repeating total reflection. However, since the optical means are disposed so as to be partially in optical contact with the light guide means on the side of the first low refractive index layer, part of the traveling light is taken out toward the optical means. The taken-out light illuminates a document placed at the opposite side of the optical means.

The reflected light from the document is collected onto the photoelectric conversion means by the lenses of the optical means. Since the reflected light from the document does not meet conditions for total reflection, the reflected light travels through the light guide means and then the second low refractive index layer to the photoelectric conversion means. Since a light path for illuminating the document is thus spacially separated from the photoelectric conversion means, arrangement and area of the photoelectric conversion means are not restricted by the light path of the illumination light.

Further, the light traveling in the light guide means is not allowed to leak out from the boundary with the second low refractive index layer by the nature of total reflection. Therefore, the photoelectric conversion means does not receive any other light than the reflected light from the document. Furthermore, since the reflected light from the document is collected by the lenses of the optical means and then incident onto the photoelectric conversion means, it is possible to prevent light mixing in adjacent pixels. Thus, high resolution can be realized.

In the case where the photoelectric conversion means is two-dimensionally arranged, a two-dimensional image input device can be realized, which is thin, lightweight, and capable of reading at high speed with high resolution.

In the case where a reflection film is disposed at an end of the light guide means opposite to an end to which the light input means is mounted, the quantity of the illumination light can be increased and uneven distribution of the illumination light can be prevented.

In the case where a pair of the light source and the light input means is mounted to each end of the light guide means, the quantity of the illumination light can be more increased and the uneven distribution of the illumination light can be more prevented.

According to the present invention, the document and an optical system for the illumination light such as the light guide means and the optical means are placed on the same side with respect to the photoelectric conversion means, and the opposite side is not used for mounting elements. In the case where light-emitting or reflection type display means is mounted on this opposite side with an insulating layer between the photoelectric conversion means and the display, the image input device and the image display device can be integrated without any optical influence to display.

EMBODIMENT 1

FIG. 1 is a sectional view of the structure of an image input device in accordance with Embodiment 1. This device is composed of a parallel transparent member 1 (the light guide means) for guiding illumination light, a low refractive index layer 2 (the second low refractive index layer) formed on the upper surface of the parallel transparent member 1, a low refractive index layer 3 (the first low refractive index layer) formed on the lower surface of the parallel transparent member 1, a photodiode 5 (the photoelectric conversion means) placed on the low refractive index layer 2, an electrode 6, a protection layer 7 to protect the photodiode 5 and the electrode 6, a lens array 4 (the optical means) mounted in contact with the parallel transparent member 1, a light source 10 to emit the illumination light, a lens 9 to collimate the illumination light emitted by the light source 10, and a prism 8 (the light input means) to direct the illumination light to the parallel transparent member 1.

The parallel transparent member 1 may be made of a glass plate, transparent plastic plate or transparent ceramic plate. The parallel transparent plate 1 functions as a light guide to guide the illumination light as well as functions as a substrate supporting the photodiode 5 and the like.

The low refractive index layers 2 and 3 are composed of a medium having a lower refractive index than that of the parallel transparent member 1. The low refractive index layer 2 covers all over the upper surface of the parallel transparent member 1. On the other hand, the low refractive index layer 3 has extremely thin portions or completely removed portions.

The lens array 4 is composed of a plastic material which has a refractive index close to that of the parallel transparent member 1. The lens array 4 is provided with a plurality of hemispherical convexes arranged on one surface. The other surface of the lens array 4 is flat. At the tops of the convexes, the lens array 4 is optically contacted with the parallel transparent member 1 via the extremely thin or completely removed portions of the low refractive index layer 3.

A plurality of the photodiodes 5 are formed on the upper surface of the low refractive index layer 2, each photodiode defining one pixel. Light is incident on the photodiodes 5 from the side of the low refractive layer 2. The electrodes 6 are electrically connected with the photodiodes 5 and output signals from the photodiodes to outside. Where the photodiodes 5 are two-dimensionally arranged, another set of electrodes orthogonal to the electrodes 6 is provided. The photodiodes 5, the electrodes 6 and the protection layer 7 together define a sensor section.

The light source 10 is composed of a halogen lamp, a white light source such as a fluorescent lamp or a light emitting diode. The prism 8 is used for making the light from the light source 10 incident on the parallel transparent member 1 at a predetermined angle. The prism may be substituted with a hologram.

The low refractive index layers 2 and 3 may be formed by depositing a resin of low refractive index on the surfaces of the parallel transparent member 1 by a dip coating or a spin coating method. Alternatively, in the case where the parallel transparent member 1 is made of glass or plastic, an ion beam may be irradiated on a surface of the parallel transparent member to change the refractive index at the surface. Or the glass or plastic material may be dipped in a molten salt, and the nature of the material may be modified at the surface by ion exchange by applying an electric field in order to control the refractive index of the material.

Figure 2:
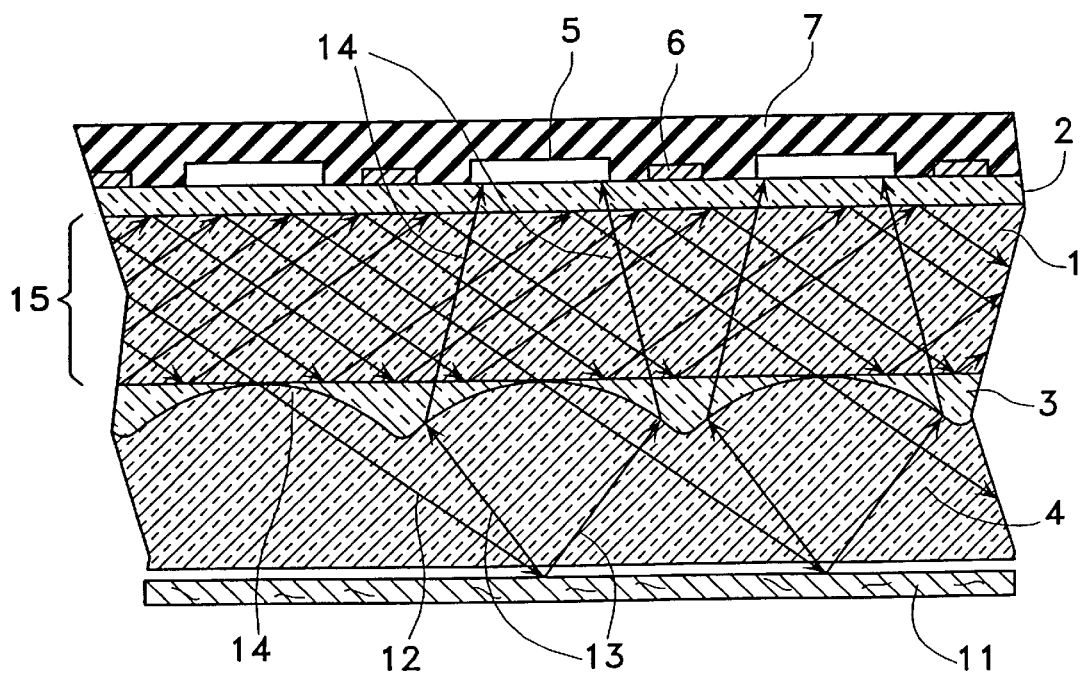
FIG. 2 illustrates the principle of operation of an image input device in accordance with the present invention.

Next, the principle of operation of the present invention is explained with reference to FIGS. 1 and 2. In FIG. 2, like reference numbers denote like elements in FIG. 1. The light emitted by the light source 10 is converted to generally parallel light by the lens 9 and incident on an end surface of the prism 8. The light is not limited to parallel light, but it is preferable that the light is incident onto the parallel transparent member 1 at a constant incidence angle because the light is transmitted within the parallel transparent member 1 more effectively.

Letting the refractive index of the parallel transparent member 1=n1 and the refractive index of the low refractive index layers 2 and 3=n2, the individual materials are selected so as to satisfy the following formula I:

$$n1 > n2 \qquad \text{Formula I}$$

Here, of light beams directed from the parallel transparent member 1 toward the low refractive index layer 2 or 3, those which are incident on the boundary between the parallel transparent member 1 and the low refractive index layer 2 or 3 at an incidence angle $\theta_O$ larger than a critical angle $\theta_C$ which satisfies the following formula II:

$$\sin \theta_C = n2/n1 \qquad \text{Formula II}$$

are totally reflected and transmitted within the parallel transparent member 1.

When light is totally reflected, the light does not pass through the boundary. Thus the light beams 15 incident at incidence angles $\theta_O$ larger than the critical angle $\theta_C$ are efficiently transmitted in the parallel transparent member 1. In this connection, in the case where the prism 8 and the parallel transparent member 1 have different refractive indexes, the incidence angle of a light beam onto the prism 8 must be set SQ as to allow for a considerable refraction at the boundary between the prism 8 and the parallel transparent member 1.

FIG. 2 shows an enlarged view of FIG. 1. The parallel transparent member 1 and lens array 4 are optically contacted at the top portion 4a of each lens. The low refractive index layer 3 is extremely thin or completely removed at portions where the low refractive index layer 3 is in contact with the top portion 4a. A document 11 is placed on the flat lower surface of the lens array 4.

As discussed above, the light beams 15 are transmitted in the parallel transparent member 1 with repeating total reflection. At the top portion 4a, however, since the lens array 4 has a refraction index near that of the parallel transparent member 1 and therefore does not satisfy the condition for the total reflection. In other words, the lens array 4 is optically contacted with the parallel transparent member 1. Accordingly the light beams are not totally reflected at the boundary and partially leak into the lens array 4. Light beams 12 leaking into the lens array 4 illuminate the document 11.

Reflected light 13 from the document 11 is collected onto the photodiode 5 by the lens array 4. Light beams 14 passing through the lens array 4 never satisfy the total-reflection conditions. Therefore the light beams 14 pass through the parallel transparent member 1 and the low refraction index layer 2 and reach the photodiode 5. Here an photoelectric conversion output is generated according to contrast of the document 11, and an image of the document 11 is inputted. Since lens effect of the lens array 4 takes place at the boundary between the lens array 4 and the low refraction index layer 3, the shape of the individual lenses of the lens array 4 must be designed in consideration of the refraction indexes of the lens array 4 and the low refraction index layer 3. In addition, a pitch of the photodiodes 5 do not necessarily agree with that of the lenses of the lens array 4, but the photodiodes and the lenses are preferably arranged so that light is collected in correspondence with the photodiodes 5.

While the light beams 15 are being transmitted from one end to the other end of the parallel transparent member 1, light escapes from the parallel transparent member 1 little by little where the transparent member 1 contacts the lens array 4. As a result, more light leaks near the prism 8 and the quantity of leaking light gradually decreases to the end opposite to the prism 8. Accordingly, the quantity of illumination light varies depending on places, and shading takes place. In order to prevent this, the area of the photodiodes may be changed according to where they are placed. More particularly, the area of the photodiodes is set smallest near the prism 8 and is gradually increased toward the opposite end. Alternatively, electric signals can be weighted for correction. However, to vary the area of the photodiodes is advantageous because the dynamic range of the photodiodes can effectively be used.

As discussed above, according to this embodiment, since the route of the illumination light and that of the reflected light from the document are independent of each other, the area of the photodiodes does not need reduction for the route of the illumination light. Since the area of the photodiodes is not restricted for the route of the illumination light and therefore can be set large, high-power signal output can be obtained. This contributes to improvement of resolution.

Since light does not pass through the boundary of the parallel transparent member 1 with the low refractive index layers thanks to the total reflection, the illumination light and the reflected light from the document do not mix with each other and the illumination light is not incident onto the photodiodes 5 directly. As a result, a signal output of high contrast can be obtained.

Furthermore, since the reflected light from the document is collected by the individual lenses of the lens array 4, it is possible to prevent light from entering from adjacent pixels. Thus a sharp signal output can be obtained.

Particularly according to this embodiment, the route of the illumination light can be ensured regardless of the area and arrangement of the photodiodes. Therefore, in the case where the invention is adapted for a two-dimensional image sensor, there is spatial room obtained. Further, since a pixel can be protected against light from adjacent pixels, this embodiment can be developed into a two-dimensional image sensor without any problem.

EMBODIMENT 2

Figure 3:
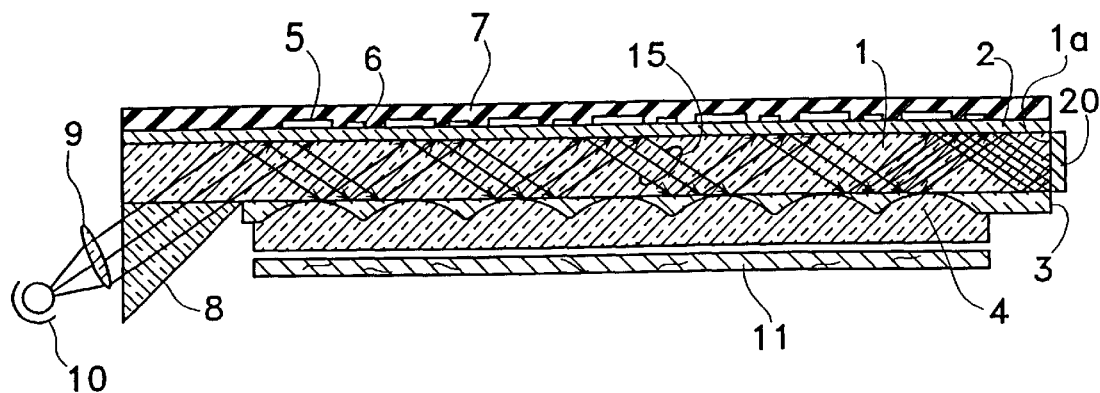
FIG. 3 is a sectional view of the structure of an image input device in accordance with Embodiment 2 of the present invention.

FIG. 3 shows a sectional view of the structure of an image input device in accordance with Embodiment 2. In FIG. 3, like reference numbers denote like elements in FIG. 1. This embodiment is structurally characterized in that a reflection film 20 is formed on an end surface 1a of a parallel transparent member 1 opposite to an end surface to which a prism 8 is mounted. The reflection film 20 is made of a metal film or an electrically conductive film and covers all over the end surface 1a of the parallel transparent member 1.

This embodiment is effective against the problem of shading. In FIG. 1 illustrating Embodiment 1, the light beams 15 traveling in the parallel transparent member 1 from the end to which the prism 8 is mounted escape out of the parallel transparent member 1 when the light beams reach the end surface 1a. Referring to FIG. 3, because the end surface 1a is covered with the reflection film, the light beams 15 having reached the end surface 1a are reflected to be light beams 21 which reversely travels in the parallel transparent member 1.

Thus, this embodiment can use light effectively and has the effect of increasing the amount of illumination light. Since the amount of illumination light can be increased especially in the neighborhood of the end surface 1a, this embodiment has the effect of improving a shading characteristic. In addition, by adjusting the length of the parallel transparent member 1 in the direction of the traveling of the light beams 15 or the incidence angle of the light beams 15, the quantity of light received by all the photodiodes 5 can be made substantially uniform without changing the area of the photodiodes 5.

EMBODIMENT 3

Figure 4:
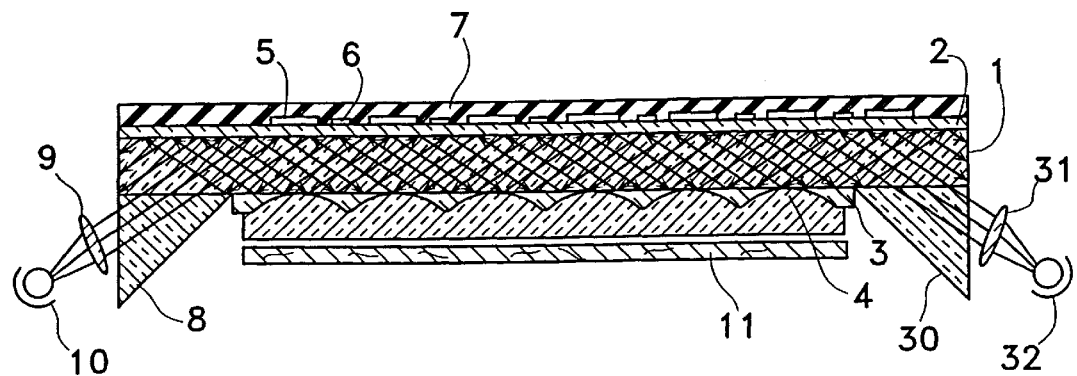
FIG. 4 is a sectional view of the structure of an image input device in accordance with Embodiment 3 of the present invention.

FIG. 4 is a sectional view of the structure of an image input device in accordance with Embodiment 3. In FIG. 4, like reference numbers denote like elements in FIG. 1. This embodiment is characterized in that, to an end opposite to an end to which a prism 8 is mounted, another prism 30, lens 31 and light source 32 are mounted so that light is introduced from both ends of the parallel transparent member 1. The prism 30, lens 31 and light source 32 are equivalent to and have the same functions as the prism 8, lens 9 and light source 10, respectively.

As discussed above, the shading problem is involved with Embodiment 1 shown in FIG. 1. In this embodiment, since light is introduced from both the sides of the parallel transparent member 1, the uniformity in distribution of the illumination light can greatly be improved. In addition, by adjusting either the length of the parallel transparent member 1 in the direction of the traveling of the light beams 15 or the incidence angle of the light beams 15, the quantity of light received by all the photodiodes 5 can be made substantially uniform without changing the area of the photodiodes 5. Further, since two light sources are used, the quantity of illumination light is increased as a natural result. Furthermore, if reflective films are additionally used at both the end surfaces of the parallel transparent member 1 as in the embodiment shown in FIG. 3, the above-described effects become more outstanding.

EMBODIMENT 4

FIG. 5 is a sectional view of the structure of an image input device in accordance with Embodiment 4. In FIG. 5, like reference numbers denote like elements in FIG. 1. This device is composed of a parallel transparent member 1 to guide illumination light, a low refractive index layer 2 formed on an upper surface of the parallel transparent member 1, a low refractive index layer 3 formed on a lower surface of the parallel transparent member 1, photodiodes 5 placed above the low refractive index layer 3, TFTs 40 for driving liquid crystal arranged in alignment with the photodiodes 5, pixel electrodes 42 electrically connected with the TFTs 40, an insulating layer 43 covering the photodiodes 5 and the TFTs 40 to flatten the surface of the pixel electrodes 42, a liquid crystal layer 41 placed above the pixel electrodes 42, a glass substrate 44 to seal the liquid crystal layer 41 with opposed electrodes 44A formed on its surface, a lens array 4 disposed in contact with the parallel transparent member 1, a light source 10 to emit illumination light, a lens 9 to collimate the light emitted by the light source 10, and a prism 8 to direct the light from the light source to the parallel transparent member 1.

The parallel transparent member 1, the TFTs 40 for driving liquid crystal, the pixel electrodes 42, the insulating layer 43, the liquid crystal layer 41 and the glass substrate 44 compose a reflection type liquid crystal panel as the display means. The display means is so designed that a displayed image is observed from the side of the glass substrate 44. Since the reflection type liquid crystal panel is usually a two-dimensional display device, the photodiodes are also two-dimensionally arranged for individual pixels.

As the TFT 40 for driving liquid crystal, usable are an amorphous silicon TFT are a polysilicon TFT which are usually used as a switching element. The pixel electrode 42 is made of a metal film and also functions as a reflection plate for display light. The insulating layer 43 is formed of resin to keep insulation of the photodiodes 5 and the TFTs 40 and generally flatten the surface of the pixel electrodes 42. The liquid crystal layer 41 is formed of a guest-host liquid crystal so that it can be used as the reflection type panel. As the glass substrate 44, usable are a transparent plastic plate and a transparent ceramic plate. The panel also includes a source electrode for display to control the TFTs 40, a gate electrode, and an external input electrode for externally outputting an inputted image signal, which are not shown. However, the electrode for display and the image input electrode can be shared. By thus integrating the image input device and the reflection type liquid crystal panel, the construction can be simplified with the display electrode and image input electrode shared.

The principle of operation of this embodiment as the image input device is shown in FIG. 2. Light traveling in the parallel transparent member 1 is taken out for illumination a document to the lens array 4 at contact points of the parallel transparent member 1 with the lens array 4. Light reflected from the document 11 is collected onto the photodiodes 5 by lens effect of the lens array 4. Amplifying circuits corresponding to the individual photodiodes 5 may be disposed near the photodiodes to allow the reflective type liquid crystal panel to display an image directly by image input signals read by the photodiodes 5. Alternatively, when solar batteries are used in place of the photodiodes 2, display can be made without amplifying circuits.

This embodiment is characterized in that the image input device can be added to the reflection type liquid crystal panel without giving any influence to the reflection type liquid crystalpanel as a display device. The TFT 40 for driving liquid crystal is smaller than the pixel electrode 42, and accordingly there is sufficient room for forming a photodiode 5 beside the TFT 40.

When viewed from the surface on which the photodiodes 5 are arranged, all constituents of the image input device including the document and the optical system for the illumination light are on the same side. On the other hand, the incidence of illumination light for display and the emission of display light of the reflection type liquid crystal panel are made above the pixel electrode 42. Thus the optical system of the image input device and that of the display device are separated, and therefore these optical systems do not affect each other optically.

However, the TFTs 40 for driving the liquid crystal also receive light from the parallel transparent member 1 and this light might change characteristics of the TFTs for driving the liquid crystal. However, this problem can be avoided by forming a light-tight film on a bottom surface of the TFTs 40.

Light-emission type display means other than the above-described reflection type liquid crystal panel which output and input display light only from one side include an LED array, electroluminescence (EL) panel, plasma display panel (PDP) and field emission display (FED).

According to the image input device of the present invention, because the optical path for illuminating the document can be made independent of the optical path of light reflected from the document, the area of the photoelectric conversion means is not reduced for the optical path of the illumination light. Therefore it is possible to obtain a large signal output and a high S/N ratio.

The light traveling in the light guide means does not leak outside except where the light guide means is optically contacted with the lens. Accordingly, the illumination light is not incident onto the photoelectric conversion means directly, and a signal output of high contrast ratio can be obtained.

The light reflected from the document is collected by each of the lenses and made incident onto the photoelectric conversion means. It is possible to prevent light from entering from adjacent pixels and therefore to improve the resolution of the input image.

If the present invention is applied for a so-called two-dimensional image sensor, it is possible to obtain more of the above-discussed effects. These effects are more outstanding with high-density, high-definition pixels.

The quantity of the illumination light can be increased and uniformity in distribution of the illumination light can be improved.

In the case where light is emitted from both sides of the light guide means, the quantity of the illumination light can further be increased and uniformity in distribution of the illumination light can further be improved.

The constituents of the image input device including the optical system for the illumination light and the document setting can be all placed on the same side, viewed from the surface on which the photoelectric conversion means is placed. With this construction, the image input device of the present invention can be integrated with a display in which light is outputted and inputted from only one side without any optical interference to each other.

What is claimed is:

1. An image input device comprising:

a light source to emit light;

light guide means for guiding the light having opposed surfaces;

a first low refractive index layer formed on one of the opposed surfaces of the light guide means, the first low refractive index layer having a lower refractive index than the refractive index of the light guide means;

a second low refractive index layer formed on the other of the opposed surfaces of the light guide means, the second low refractive index layer having a lower refractive index than the refractive index of the light guide means;

light input means to make the light emitted by the light source incident onto the light guide means so that the incident light is totally reflected at a boundary between the light guide means and the first low refractive index layer and at a boundary between the light guide means and the second low refractive index layer;

photoelectric conversion means for photoelectric conversion, the photoelectric conversion means being disposed on the second low refractive index layer; and optical means having a plurality of lenses optically contacted with the surface of the light guide means via the first low refractive index layer, the optical means taking out part of the light traveling in the light guide means to illuminate a document and collecting light reflected from the document onto the photoelectric conversion means by means of the lenses.

2. The image input device of claim 1, wherein the photoelectric conversion means is two-dimensionally arranged.

3. The image input device of claim 1 or 2 further comprising a reflection film disposed at an end of the light guide means.

4. The image input device of claim 1 or 2, wherein both the light source and the light input means are mounted to each end of the light guide means.

5. The image input device of claim 1 further comprising integrated display means on the photoelectric conversion means.

6. The image input device of claim 1, wherein the light guide means is a transparent plate.

7. The image input device of claim 6, wherein the light input means comprises a lens to collimate the light from the light source and a prism or a hologram to direct the collimated light from the lens into the transparent plate.

8. The image input device of claim 6, wherein the optical means comprises a lens array having a surface with a plurality of hemispherical convexes and another flat surface.

9. The image input device of claim 8, wherein the second low refractive index layer covers all over an upper surface of the transparent plate, the first low refractive index layer covers all over a lower surface of the transparent plate and has extremely thin portions or removed portions, and the first lower refractive index layer contacts the lens array in such a manner that the extremely thin portions or the removed portions of the first lower refractive index layer corresponds to tops of the hemispherical convexes of the lens array.

10. The image input device of claim 6, wherein at least one of the first and second lower refractive index layers is formed by depositing a resin having a low refractive index on a surface of the transparent plate.

11. The image input device of claim 6, wherein at least one of the first and second lower refractive index layers is formed by irradiating an ion beam to a surface of the transparent plate to change refractive index of the surface, or by dipping the transparent plate in a molten salt and apply an electric field thereto to change nature of a material of the transparent plate at a surface by ion exchange so as to change refractive index of the surface.

12. The image input device of claim 6 further comprising a reflection film provided at an end of the transparent plate so that the light directed to another end of the transparent plate by the light input means to travel in the transparent plate is reflected by the reflection film to travel back in the transparent plate.

13. The image input device of claim 6, wherein both the light source and the light input means are mounted to each end of the transparent panel so that light is directed into the transparent plate from both the ends of the transparent plate.

14. A personal computer or a portable terminal utilizing an image input device as recited in claim 1.

15. A facsimile machine or a digital copier utilizing an image input device as recited in claim 1.

* * * * *